(12) United States Patent
Naser

(10) Patent No.: US 9,970,480 B1
(45) Date of Patent: May 15, 2018

(54) PERISCOPE UNIVERSAL HULL PACKING

(71) Applicant: Mark M. Naser, Audobon, PA (US)

(72) Inventor: Mark M. Naser, Audobon, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 541 days.

(21) Appl. No.: 13/874,130

(22) Filed: Apr. 30, 2013

(51) Int. Cl.
*B63G 8/00* (2006.01)
*F16C 17/14* (2006.01)
*F16C 33/74* (2006.01)
*B63G 8/38* (2006.01)

(52) U.S. Cl.
CPC ............... *F16C 17/14* (2013.01); *B63G 8/38* (2013.01); *F16C 33/74* (2013.01)

(58) Field of Classification Search
CPC ............ F16C 33/74; F16C 17/14; B63G 8/38
See application file for complete search history.

(56) References Cited

U.S. PATENT DOCUMENTS

| | | | |
|---|---|---|---|
| 1,514,621 A | 11/1924 | Kollmorgen | |
| 2,173,192 A | 9/1939 | Williams | |
| 2,568,392 A | 9/1951 | Gilbert, Sr. | |
| 2,600,321 A * | 6/1952 | Pyle | F16C 33/201 16/DIG. 27 |
| 2,791,194 A | 5/1957 | Janise | |
| 2,936,187 A | 5/1960 | Peterson | |
| 3,183,922 A * | 5/1965 | Lamb | E21B 43/123 137/155 |
| 4,013,299 A | 3/1977 | Scott | |
| 4,141,563 A | 2/1979 | Wu | |
| 4,174,846 A | 11/1979 | Scott | |
| 4,328,972 A | 5/1982 | Albertson et al. | |
| 4,373,739 A * | 2/1983 | Klem | B60G 9/02 180/9.5 |
| 4,618,154 A | 10/1986 | Freudenthal | |

(Continued)

OTHER PUBLICATIONS

Fluid Power Seal Design Guide, Catalog EPS 5370, 2012, Parker Hannifin Corporation, Salt Lake City, Utah (424 pages). See, especially, cover page and pp. 6-3 through 6-5 (e.g., Table 6-2 and Table 6-3).

(Continued)

*Primary Examiner* — Matthieu F Setliff
*Assistant Examiner* — Thomas L Neubauer
(74) *Attorney, Agent, or Firm* — Howard Kaiser

(57) ABSTRACT

An embodiment of an inventive periscope hull packing system includes a sleeve, a first ring, a first spring-loaded hull seal, a second ring, a second spring-loaded hull seal, and a gland. The first ring is below the sleeve. The first spring-loaded hull seal is below the first ring. The second ring is below the first spring-loaded hull seal. The second spring-loaded hull seal is below the second ring. The gland and the second spring-loaded hull seal, which is housed by the gland, are below the second ring. The sleeve and the gland each have, on the inside circumference, a composite lining affording a lubricious surface for contacting the periscope. Each composite lining is composed of a resinous matrix and a filler lubricant (such as particles or short discontinuous fibers of polytetrafluoroethylene). Each spring-loaded hull seal is characterized by an elastomeric shell and an elastomeric O-ring spring for energizing the shell.

14 Claims, 2 Drawing Sheets

(56) References Cited

U.S. PATENT DOCUMENTS

| | | |
|---|---|---|
| 4,687,212 A | 8/1987 | Timpson, Jr. et al. |
| 4,723,782 A | 2/1988 | Muller |
| 4,771,721 A | 9/1988 | Pratt |
| 4,848,886 A | 7/1989 | Pratt |
| 5,110,221 A | 5/1992 | Narkon et al. |
| 5,137,374 A | 8/1992 | Orkin |
| 5,269,537 A | 12/1993 | Kiesel |
| 5,398,294 A | 3/1995 | Narkon |
| 5,472,216 A | 12/1995 | Albertson et al. |
| 5,537,746 A | 7/1996 | Narkon |
| 5,720,111 A | 2/1998 | McMullen |
| 6,180,574 B1 | 1/2001 | Ryan et al. |
| 6,385,955 B1 | 5/2002 | Rowlands et al. |
| 6,412,784 B1 | 7/2002 | Cohen |
| 6,729,763 B2 | 5/2004 | Post et al. |
| 6,910,692 B2 * | 6/2005 | Malone ............... F16J 15/3236 277/530 |
| 7,480,996 B2 | 1/2009 | Davies et al. |
| 7,536,746 B2 | 5/2009 | Rutledge et al. |
| 8,075,000 B2 | 12/2011 | James et al. |
| 2010/0052267 A1 * | 3/2010 | Castleman ............. F16J 15/166 277/551 |
| 2011/0140369 A1 * | 6/2011 | Lenhert ............... F16J 15/3216 277/589 |

OTHER PUBLICATIONS

Kamatics KAron® Design Guide, Revision E, Mar. 4, 2005, Kamatics Corporation, Bloomfield, Connecticut (44 pages). See, especially, pp. 1-12.

Metal Seal Design Guide, Catalog CSS 5129, Jul. 2013, Parker Hannifin Corporation, Composite Sealing Systems Division, Advanced Products Business Unit, North Haven, Connecticut (106 pages). See, especially, cover page and pp. B-14, C-20 through C-23, D-53, and E-76.

PolyPak Seals for Hydraulic Applications, Catalog EPS 5370_PolyPak, Parker Hannifin Corporation, Engineered Polymer Systems Division, Salt Lake City, Utah (38 pages). See, especially, cover page and pp. 1-3.

\* cited by examiner

PERISCOPE UNIVERSAL HULL PACKING

BACKGROUND OF THE INVENTION

The present invention relates to periscopes such as used onboard submarines, more particularly to methods and apparatuses for sealing a periscope to prevent infiltration of water into the submarine hull.

A periscope is an optical device for enabling a user to observe objects that are otherwise outside the field of view of the user. The optics of a periscope may involve lenses, mirrors, and/or prisms. According to traditional operation of a periscope onboard a naval submarine, the vertical periscope protracts upward from the submarine hull to permit observation above the water surface while the submarine is submerged, and retracts downward into the submarine hull when the periscope is not in use, such as while the submarine is afloat.

A periscope must be sealed with respect to the submarine hull opening. The terms "hull packing system" and "hull fitting system" are used synonymously herein. A hull packing system must be implemented to completely separate the two fluid media (viz., the water surrounding the submarine, and the air contained in the submarine), particularly when the submarine is deeply submerged. The components of a hull packing system must be arranged and aligned so that the periscope is capable of being raised and lowered and trained, with minimal risk of leakage, while the submarine is submerged. The water must be maintained outside the submarine, the atmospheric air must be maintained inside the submarine, and flooding of the submarine must be prevented.

Periscope hull packing systems previously implemented by the United States Navy were designed for older classes of ships. The hull packing was cumbersome to maintain, was susceptible to seal-side loading and rolling, caused high training torque, resulted in high maintenance costs, required frequent greasing, and included many parts. Because there were so many parts, the removal and installation of the hull packing was more labor consuming than desired.

A number of failures were related to the Navy's old hull packing designs, especially with the incompatibility of the seals with respect to the cavities of newer submarines. In general, rolled seals (e.g., secondary seals and salvage seals) result in excessive training torque; Navy investigations attributed many seal failures to rolling of the seals. Because of problems such as these, many periscopes were removed from submarines and were reinstalled with repacked hull fittings.

Incorporated herein by reference are the following United States patents that are of interest with regard to sealing systems for periscopes: Kollmorgen U.S. Pat. No. 1,514,621 issued 11 Nov. 1924; Williams U.S. Pat. No. 2,173,192 issued 19 Sep. 1939; Gilbert, Sr. U.S. Pat. No. 2,568,392 issued 18 Sep. 1951; Janise U.S. Pat. No. 2,791,194 issued 7 May 1957; Peterson U.S. Pat. No. 2,936,187 issued 10 May 1960; Pratt U.S. Pat. No. 4,771,721 issued 20 Sep. 1988; Pratt U.S. Pat. No. 4,848,886 issued 18 Jul. 1989.

SUMMARY OF THE INVENTION

In view of the foregoing, an object of the present invention is to provide an improved hull packing system for a submarine periscope.

According to exemplary practice of the present invention, a hull packing system for a periscope includes a metallic sleeve, a metallic upper ring, an upper spring-loaded hull seal, a metallic lower ring, a lower spring-loaded hull seal, and a metallic gland. The sleeve is lined on its inside with a first composite material, which includes a first resinous matrix material and a first lubricious filler material in the first resinous matrix. The upper ring is situated adjacently below the sleeve. The upper spring-loaded hull seal is situated adjacently below the upper ring, and has an elastomeric upper-seal shell and an elastomeric upper-seal O-ring spring. The lower ring is situated adjacently below the upper spring-loaded hull seal. The lower spring-loaded hull seal is situated adjacently below the lower ring, and has an elastomeric lower-seal shell and an elastomeric lower-seal O-ring spring. The gland is lined on its inside with a second composite material, which includes a second resinous matrix material and a second lubricious filler material in the second resinous matrix. The gland is configured to accommodate the lower spring-loaded hull seal so that the gland and the lower spring-loaded hull seal are situated adjacently below the lower ring.

Many embodiments of an inventive hull packing system further include an elastomeric glandular O-ring, a metallic backup seal ring, and a wiper. The gland is configured to accommodate the glandular O-ring. The lower spring-loaded hull seal is configured to accommodate the backup seal ring so that the lower ring is situated adjacently below the lower spring-loaded hull seal and the backup seal ring. The wiper is situated adjacently above the sleeve. The first lubricious filler material, or the second lubricious filler material, or both, include polytetrafluoroethylene.

In contrast to the previous hull packing, the present invention's "Periscope Universal Hull Packing" ("PUHP") system is characterized by fewer parts and more efficient seals. As typically embodied, the inventive hull packing features, inter alia, two spring-loaded seals—viz., a primary seal and a secondary seal—such as PolyPak® seals, manufactured by Parker Hannifin Corporation, Engineered Polymer Systems Division, 2220 South 3600 West, Salt Lake City, Utah, 84119. The primary and secondary seals are elastic and can provide watertight integrity at any pressure, low or high, and can also provide sufficient sealing capability (e.g., 500 psi) in the reverse direction to satisfy compartmental pressure test requirements of the Navy's Joint Fleet Maintenance Manual (JFFM).

In addition, the inventive hull packing features self-lubricating bearing surfaces on the upper bearing sleeve retainer and the gland. The sleeve and the gland are each covered with a special homogenous resin-and-filler self-lubricating bearing material, such as a KAron® lining material manufactured by Kamatics Corporation, 1330 Blue Hills Avenue, Bloomfield, Conn., 06002. According to exemplary inventive embodiments, the self-lubricating bearing areas do not require any greasing. By virtue of the self-lubricating quality of the seals and bearings, the need for greasing the periscope is obviated, thus affording cost-saving benefits in labor and material.

The present invention's PUHP design, as typically embodied, incorporates current technologies in self-lubricating bearings and spring-loaded (e.g., PolyPak®) seals, and uses fewer parts. Among its potential advantages, the inventive periscope hull packing fits all classes of Navy submarines, implements a single set of parts in an inventory for many or all submarines, provides sealing at all pressures, provides salvage ability for permitting inside pressurization in emergency, eliminates seal rolling, eliminates seal side loading, obviates greasing of the bearing, requires less maintenance, costs less to maintain, and lasts longer in service.

BRIEF DESCRIPTION OF THE DRAWINGS

The present invention will now be described, by way of example, with reference to the accompanying drawings, wherein:

FIG. 1 compares an example of a conventional periscope hull packing system (shown to the left of the periscope), versus an example of the present invention's periscope universal hull packing system (shown to the right of the periscope).

FIG. 2 is similar to FIG. 1 and corresponds, on both the left-hand and right-hand sides, to the right-hand side of FIG. 1.

DESCRIPTION OF EXEMPLARY EMBODIMENTS OF THE INVENTION

Figure 1:
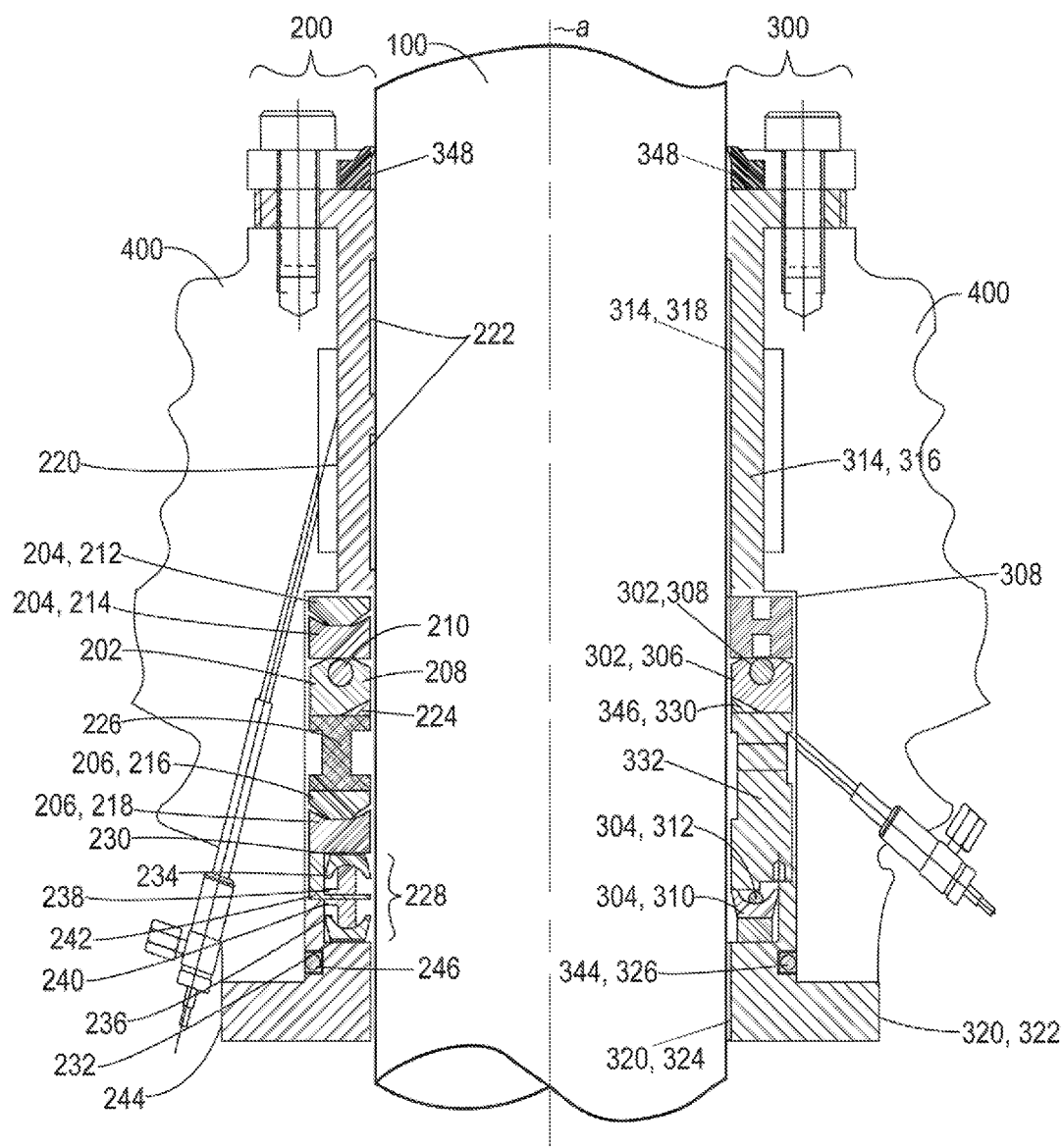
FIG. 1 is a diagram illustrating, in cross-section, the association of hull packing with a submarine hull and a submarine periscope.

Referring now to the figures, periscope 100 is characterized by a vertical geometric longitudinal axis a. Hull packing is applied in order to seal the periscope 100 with respect to the submarine hull fitting (hull casting) 400. In FIG. 1, an example of a traditional hull packing system 200 (shown along the left-hand side of periscope 100) and an example of the present invention's hull packing system 300 (shown along the right-hand side of periscope 100) are juxtaposed. The inventive hull packing assembly 300 is shown bilaterally in cross-section in FIG. 2.

With reference to the left-hand side of FIG. 1, the main sealing components of a traditional hull packing system 200 are a primary hull seal 202, a U-cup secondary seal 204, and a U-cup salvage (emergency) seal 206. The primary seal 202 is a spring-loaded seal that includes an elastic lipped member 208 and an elastic O-ring member 210. An example of a commercially available spring-loaded seal that has been known to be useful as a primary seal 102 is a PolyPak® seal, manufactured by Parker Hannifin Corporation. Lipped member 208 has a cavity, and O-ring member 210 is situated in the cavity. Secondary seal 204 includes a secondary seal male packing ring 212 and a secondary seal female packing ring 214. Salvage seal 206 includes a salvage seal male packing ring 216 and a salvage seal female packing ring 218.

Traditional hull packing assembly 200 includes, in addition, many metal parts mainly for support of primary seal 202, secondary seal 204, and salvage seal 206. Metallic sleeve bearing 220, positioned in the upper portion of hull fitting 400, centers periscope 100 in hull fitting 400. Above sleeve bearing 220 is a wiper 248, for clearing water and debris. Two recessed areas of sleeve bearing 220 respectively accommodate two inserts 222 made of polytetrafluoroethylene (PTFE), such as the brand name Teflon®, manufactured by DuPont Company. PTFE inserts 222 are attached, in the recessed areas, to sleeve bearing 220. A metallic backup seal ring 224 is positioned contiguously below primary seal 202, and contiguously above lantern ring 226.

Metallic lantern ring 226 acts as a spacer between parts thereabove (including secondary seal 204) and parts therebelow (including backup seal ring 224 and primary seal 202), and stores grease for lubricating primary seal 202, secondary seal 204, and salvage seal 206. Immediately below salvage seal 206 is a metallic multipart unit 228 including upper backup ring 230, lower backup ring 232, upper U-cup 234, lower U-cup 236, upper support ring 238, lower support ring 240, and a medial packing ring 242 (which is in the middle of multipart unit 228). Multipart unit 228 acts as a spacer between salvage seal 206, above, and metallic packing gland 244, below. Gland 244 is adjacently beneath lower backup ring 232. Non-metallic (e.g., elastomeric or rubber) O-Ring 246 maintains a watertight seal in the back of gland 244 to prevent water or grease leaks inside of the submarine.

Figure 2:
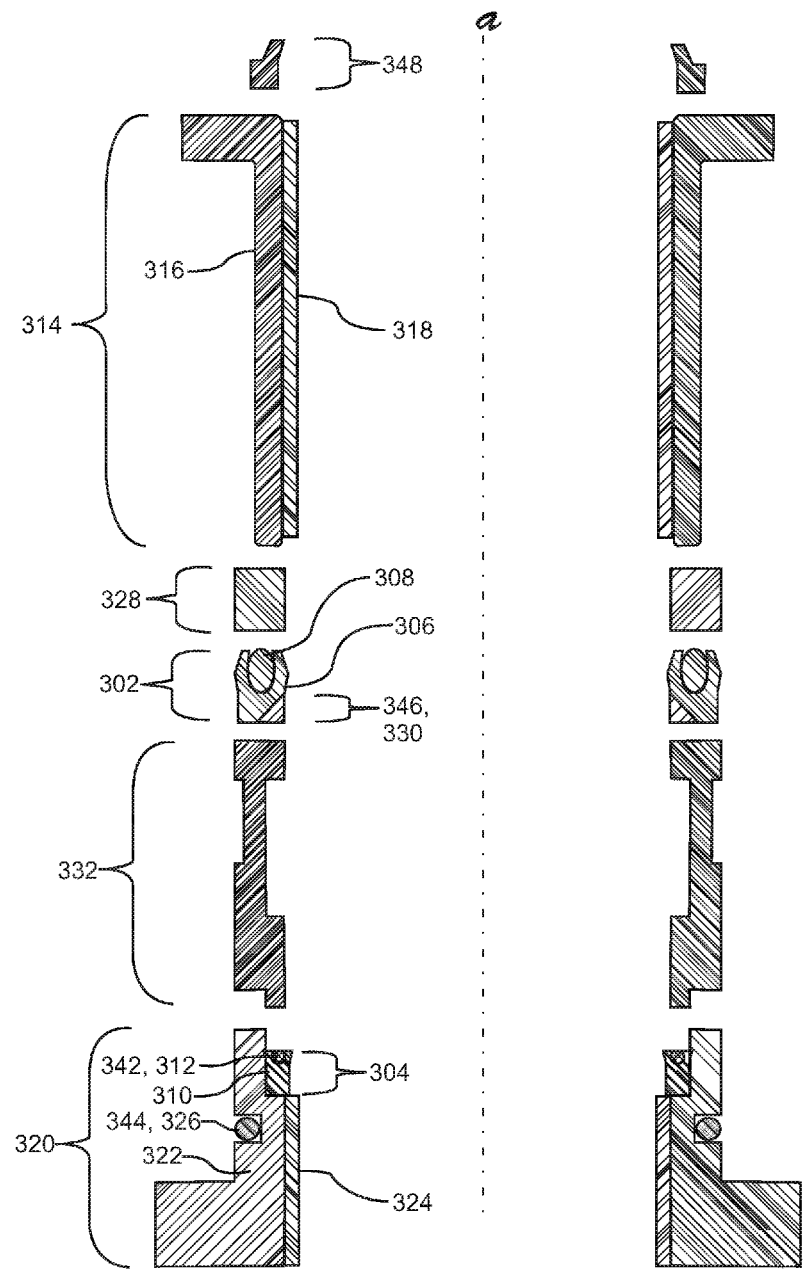
FIG. 2 is a diagram illustrating, in cross-section, the example shown in FIG. 1 of the present invention's periscope universal hull packing.

With reference to FIG. 2 and the right-hand side of FIG. 1, the main sealing components of the present invention's Periscope Universal Hull Packing (PUHP) system 300 are a primary spring-loaded hull seal 302 and a secondary spring-loaded hull seal 304. The two seals, viz., primary seal 302 and secondary seal 304, impart watertight integrity to the system. Each of seals 302 and 304 is a spring-loaded seal, according to exemplary inventive practice having resilient constituents. Spring-loaded seals 302 and 304 are each specifically designed for a given inventive application to provide seal at any given pressure with a high degree of reliability, and to eliminate rolling under any circumstance, thereby eliminating high training torque in the system.

Seals 302 and 304 are spring-loaded in similarly constructed manners, each having a spring-loaded configuration similar to that shown of primary seal 202 in the traditional hull packing assembly 200. Primary seal 302 includes an elastic lip-seal-like member 306 and an elastic O-ring-like spring/energizer/expander member 308. Similarly, secondary seal 304 includes an elastic lip-seal-like member 310 and an elastic O-ring-like spring/energizer/expander member 312. In each of the seals 302 and 304, the lip seal member includes a circumferential cavity, and the spring/energizer/expander member fits inside the cavity and exerts the spring-loading.

Terms such as "O-ring-like spring/energizer/expander member," "0-ring member," O-ring expander member," and "0-spring energizer" are used synonymously herein to refer to the spring-energizing component of a spring-loaded seal. Terms such as "lip-seal-like member," "lipped member," "lip-seal member," and "shell" are used synonymously herein to refer to the spring-energized component of a spring-loaded seal.

An example of a commercially available seal that is suitable for use as either or both of primary seal 302 and secondary seal 304, in many applications of the present invention, is the aforementioned PolyPak® seal, manufactured by Parker Hannifin Corporation, Engineered Polymer Systems Division, 2220 South 3600 West, Salt Lake City, Utah, 84119; see, e.g., Fluid Power Seal Design Guide, Catalog EPS 5370, Parker Hannifin Corporation, 2012, incorporated herein by reference. As disclosed by Parker Catalog EPS 5370, varieties of configurations and material combinations of the PolyPak seal are possible. An important consideration in selecting materials for the PolyPak is that both the shell and the O-spring energizer be compatible with temperature, pressure, and fluid requirements of a given application.

The Parker catalog suggests that both "standard" and "custom" options are available for their PolyPak materials. Six "standard" combinations of materials for the PolyPak are disclosed by the catalog as follows: Molythane® shell, and 70A nitrile O-spring energizer; Polymyte® shell, and 70A nitrile, 75A FKM O-spring energizer; Nitroxile® shell, and 70A nitrile O-spring energizer; ethylene propylene shell, and 80A EPR O-spring energizer; fluorocarbon shell, and 75A FKM O-spring energizer; all plastic and rubber shell, and metal O-spring energizer. The first five of these six standard material combinations provide for elastomeric materials (polyurethane, polyester rubber, nitrile rubber, fluoro rubber, ethylene propylene rubber, etc.) for both the shell and the O-spring energizer. The sixth standard material combination provides for a shell that is plastic and rubber, and an O-spring energizer that is metallic.

The following United States patents, each of which is incorporated herein by reference, are informative concerning spring-loaded seals such as may be suitable as the primary and secondary seals in inventive practice: Scott U.S. Pat. No. 4,013,299 issued 22 Mar. 1977; Wu U.S. Pat. No. 4,141,563 issued 27 Feb. 1979; Scott U.S. Pat. No. 4,174,846 issued 20 Nov. 1979; Albertson et al. U.S. Pat. No. 4,328,972 issued 11 May 1982; Freudenthal U.S. Pat. No. 4,618,154 issued 21 Oct. 1986; Timpson, Jr. et al. U.S. Pat. No. 4,687,212 issued 18 Aug. 1987; Muller U.S. Pat. No. 4,723,782 issued 9 Feb. 1988; Orkin U.S. Pat. No. 5,137,374 issued 11 Aug. 1992; Kiesel U.S. Pat. No. 5,269,537 issued 14 Dec. 1993; Malone et al. U.S. Pat. No. 6,910,692 B2 issued 28 Jun. 2005; James et al. U.S. Pat. No. 8,075,000 B2 issued 13 Dec. 2011.

Bearing sleeve 314 includes a metallic sleeve structure 316 and a self-lubricating sleeve liner 318, lining the inside of sleeve structure 316 and contacting the cylindrical periscope 100. A Navy prototype of an inventive hull packing system 300 implemented a metallic sleeve structure 316 made of Material Specification QQ-N-281 (nickel-copper alloy). Sleeve 314 serves to facilitate smooth rotation of periscope 100. Above sleeve bearing 314 is a wiper 348, which may be similar in structure and purpose to the wiper 248 of conventional hull packing system 200. Wiper 348 serves to clear water and debris from the field of view of periscope 100, particularly as periscope 100 moves in an axial direction.

As distinguished from analogous sleeve components in traditional systems 200, sleeve 314 has a self-lubricating material liner 318. Since the sleeve piece 316 is coated with a self-lubricating bearing material 318, greasing of the sleeve 314 component is unnecessary. This is in contrast to traditional hull packing designs, in which bearing sleeves require greasing. The clearance of self-lubricating liner 318 is low with respect to periscope 100, in order to maintain centering of periscope 100 and to provide a very smooth rotation of periscope 100.

Packing gland 320 houses secondary seal 304, keeps the parts of inventive assembly 300 locked in place, and carries the load. Packing gland 320 includes a metallic gland structure 322 and a self-lubricating gland liner 324 that coats gland structure 322. Gland structure 322 is configured in its upper region to describe an upper circumferential recess 342 for accommodating secondary seal 304, and is configured in its "L"-interior region to describe a lateral circumferential recess 344 for accommodating a resilient O-ring 326. The aforesaid Navy prototype of an inventive hull packing system 300 implemented a metallic gland structure 322 made of Material Specification MIL-B-24480 (nickel-aluminum-bronze alloy).

O-Ring 326 is a non-metallic (e.g., elastomeric or rubber) part that maintains a watertight seal in the back of gland 320 to prevent water or grease leaks inside of the submarine. The aforesaid Navy prototype of an inventive hull packing system 300 implemented an elastomeric O-Ring 326 made of Material Specification MIL-R-83248/1-445 (fluorocarbon elastomer).

As distinguished from analogous gland components in traditional systems, packing gland 320 has a self-lubricating material liner 324, lining the inside of packing gland 320 and contacting the cylindrical periscope 100. Several purposes are served by the self-lubricating coating 324 of gland 320, including: maintaining centrality of periscope 100 to prevent seal side loading; preventing metal-to-metal contact that causes noise and wear; and, facilitating the smooth rotation of periscope 100.

Interposed between sleeve 314 and primary seal 302 is metallic upper ring 328, which acts as spacer to maintain primary seal 302 in proper position. The aforesaid Navy prototype of an inventive hull packing system 300 implemented a metallic upper ring 328 made of Material Specification MIL-B-24480 (nickel-aluminum-bronze alloy).

Directly below primary seal 302 is metallic backup seal ring 330, which is similar to metallic backup seal ring 224 of the traditional hull packing system 200 shown in FIG. 2. The lip-seal member 306 of primary seal 302 is configured at the bottom to provide a circumferential bevel-gap 346, which accommodates backup seal ring 330. Backup seal ring 330 is placed immediately above metallic lower ring 332 and immediately below primary seal 302.

Lower ring 332 is a lantern ring having three main functions, viz., as a seat for the primary seal 302, as a spacer to keep all of the parts in their designated places, to provide storage for the grease that lubricates primary seal 302 and secondary seal 304. The aforesaid Navy prototype of an inventive hull packing system 300 implemented a metallic lower ring 332 made of Material Specification MIL-B-24480 (nickel-aluminum-bronze alloy).

The respective thicknesses of self-lubricating sleeve liner 318 and self-lubricating gland liner 324 can appropriately vary in inventive practice, depending on the application. The self-lubricating liners depicted in the drawings are illustrative and are not intended to suggest dimensional preferences.

An example of a self-lubricating material suitable for inventive practice of self-lubricating sleeve liner 318 and self-lubricating gland liner 324 is the aforementioned KAron® material, manufactured by KAMATICS Corporation, 1330 Blue Hills Avenue, Bloomfield, Conn., 06002; see Kamatics KAron® Design Guide, Rev E, KAMATICS Corporation, 03/04/05, incorporated herein by reference. KAron® is referred to herein as a "resin-and-filler self-lubricating material"; that is, KAron® is a combination of a thermosetting resin and lubricious filler materials, such as polytetrafluoroethylene (PTFE, e.g., the brand name Teflon®), in particle or discontinuous fiber form. For instance, the resin-and-filler self-lubricating material can be a cured mixture of an acrylate composition and a PTFE solid particulate. According to typical inventive practice, a self-lubricating lining material is a composite including a thermoset resin matrix material and discrete, lubricious solid filler material uniformly distributed therein.

KAron and other resin-and-filler self-lubricating materials differ significantly from what are referred to herein as "fabric-blanket self-lubricating materials." As advertised by KAMATICS Corporation, KAron® self-lubricating material is homogeneous and affords consistent friction and low and linear rates of wear throughout its service life. In contrast, a fabric-blanket self-lubricating material is characterized by woven or interconnecting fibers arranged in layers of different materials such as PTFE, fiberglass, nylon, resin, etc., and does not afford consistent performance throughout its thickness. Although resin-and-filler self-lubricating liner materials are usually preferred for inventive practice, fabric-blanket self-lubricating liner materials may be implemented in some inventive embodiments.

The following United States patents, incorporated herein by reference, are informative concerning self-lubricating materials such as may be suitable for lining the sleeve interior and the gland interior in inventive practice: Narkon et al. U.S. Pat. No. 5,110,221 issued 5 May 1992; Orkin U.S. Pat. No. 5,137,374 issued 11 Aug. 1992; Narkon U.S. Pat. No. 5,398,294 issued 14 Mar. 1995; Narkon U.S. Pat. No. 5,537,746 issued 23 Jul. 1996; McMullen U.S. Pat. No. 5,720,111 issued 24 Feb. 1998; Ryan et al. U.S. Pat. No. 6,180,574 B1 issued 30 Jan. 2001; Rowlands et al. U.S. Pat. No. 6,385,955 B1 issued 14 May 2002; Post et al. U.S. Pat. No. 6,729,763 B2 issued 4 May 2004; Davies et al. U.S. Pat. No. 7,480,996 B2; Rutledge et al. U.S. Pat. No. 7,536,746 B2 issued 26 May 2009.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A machine comprising a sealing apparatus and a tubular device, the tubular device being at least substantially characterized by a cylindrical shape, a longitudinal axis, and movability in an axial direction, the sealing apparatus being at least substantially symmetrical with respect to the longitudinal axis, the sealing apparatus comprising:
    a bearing sleeve including a rigid sleeve structure and a self-lubricating sleeve liner that covers at least a portion of the inside of the sleeve structure, the self-lubricating sleeve liner contacting the tubular device;
    a first spring-loaded seal including a first resilient lip-seal member and a first resilient ring-shaped metal spring, the first resilient lip-seal member having a first circumferential cavity and encompassing the first resilient ring-shaped metal spring within the first circumferential cavity, the first resilient ring-shaped metal spring encircling the longitudinal axis and lying in a first geometric plane, the first geometric plane being perpendicular to the longitudinal axis;
    a rigid first ring, for effecting spacing between the bearing sleeve and the first spring-loaded seal;
    a second spring-loaded seal including a second resilient lip-seal member and a second resilient ring-shaped metal spring, the second resilient lip-seal member having a second circumferential cavity and encompassing the second resilient ring-shaped metal spring within the second circumferential cavity, the second resilient ring-shaped metal spring encircling the longitudinal axis and lying in a second geometric plane, the second geometric plane being perpendicular to the longitudinal axis;
    a packing gland including a rigid gland structure and a self-lubricating gland liner that covers at least a portion of the inside of the rigid gland structure, the self-lubricating gland liner contacting the tubular device, the packing gland being configured to house the second spring-loaded seal, the rigid gland structure including a first end of the rigid gland structure and a second end of the rigid gland structure, the first end of the rigid gland structure having a longitudinal recess located radially inner;
    a rigid second ring, for effecting spacing between the first spring-loaded seal and the combination including the packing gland and the second spring-loaded seal, the rigid second ring including a first end of the rigid second ring and a second end of the rigid second ring, the second end of the rigid second ring having a longitudinal protrusion located radially inner;
    wherein the longitudinal protrusion of the rigid second ring nests into the longitudinal recess of the rigid gland structure;
    a resilient glandular O-ring, associated with the packing gland; and
    a rigid backup seal ring, situated between the first resilient lip-seal member and the rigid second ring;
    wherein the bearing sleeve, the first spring-loaded seal, the rigid first ring, the second spring-loaded seal, the packing gland, the rigid second ring, the resilient glandular O-ring, and the rigid backup seal ring are each at least substantially characterized by the longitudinal axis.

2. The machine of claim 1, wherein the self-lubricating sleeve liner is made of a resin-and-filler self-lubricating material that includes a thermoset resin matrix material and lubricious filler material.

3. The machine of claim 2, wherein the filler material is polytetrafluoroethylene in particle form and/or discontinuous fiber form.

4. The machine of claim 1, wherein the bearing sleeve and the packing gland are each made of a metal material.

5. The machine of claim 4, wherein the first resilient lip-seal member and the second resilient lip-seal member are each made of a material that includes at least one of a plastic material and an elastomeric material.

6. The machine of claim 5, wherein the bearing sleeve and the packing gland are each made of a metal material.

7. The machine of claim 1, wherein the bearing sleeve, the packing gland, the first ring, the second ring, and the backup seal ring are each made of a metal material, and wherein the glandular O-ring is made of an elastomeric material.

8. The machine of claim 7, wherein the second ring is characterized by a lantern ring form.

9. The machine of claim 8, wherein the filler material includes polytetrafluoroethylene in particle form and/or discontinuous fiber form.

10. The machine of claim 1, wherein the self-lubricating sleeve liner is made of a resin-and-filler self-lubricating material that includes a thermoset resin matrix material and filler material.

11. A hull packing system for a vertical periscope, said periscope generally characterized by a longitudinal vertical axis and positional adjustability along said vertical axis, the hull packing system comprising:
    a metallic sleeve, lined on its inside with a first composite material including a first resinous matrix material and a first lubricious filler material in said first resinous matrix material, said metallic sleeve being for surrounding said periscope whereby said first composite material is in contact with said periscope;
    a metallic upper ring, situated adjacently below said sleeve;
    an upper spring-loaded hull seal, situated adjacently below said upper ring and having an upper-seal shell and an upper-seal resilient ring-shaped metal spring;
    a metallic lower ring, situated adjacently below said upper spring-loaded hull seal;
    a lower spring-loaded hull seal, situated adjacently below said lower ring and having a lower-seal shell and a lower-seal resilient ring-shaped metal spring, said metallic lower ring including a first end of said metallic lower ring and a second end of said metallic lower ring, said second end of said metallic lower ring having a longitudinal protrusion located radially inner; and a metallic gland, lined on its inside with a second composite material including a second resinous matrix material and a second lubricious filler material in said second resinous matrix material, said metallic gland being for surrounding said periscope whereby said second composite material is in contact with said periscope, said metallic gland configured to accommodate said lower spring-loaded hull seal so that said metallic gland and said lower spring-loaded hull seal are situated adjacently below said lower ring, said metallic gland including a first end of said metallic gland and a second end of said metallic gland, said first end of said metallic gland having a longitudinal recess located radially inner;

wherein said longitudinal protrusion of said metallic lower ring nests into said longitudinal recess of said metallic gland;

an elastomeric glandular O-ring, said gland configured to accommodate said elastomeric glandular O-ring; and a metallic backup seal ring, said lower spring-loaded hull seal configured to accommodate said metallic backup seal ring so that said metallic lower ring is situated adjacently below said lower spring-loaded hull seal and said backup seal ring;

wherein said metallic sleeve, said metallic upper ring, said upper spring-loaded hull seal, said metallic lower ring, said lower spring-loaded hull seal, said metallic gland, said elastomeric glandular O-ring, and said metallic backup seal ring are combinable with said periscope so as to be generally characterized by the same said longitudinal axis; and wherein said upper-seal resilient ring-shaped metal spring and said lower-seal resilient ring-shaped metal spring each encircle said periscope and lie in a horizontal geometric plane.

12. The hull packing system of claim 11, wherein at least one of said first lubricious filler material and said second lubricious filler material includes polytetrafluoroethylene.

13. The hull packing system of claim 11, further comprising a wiper situated adjacently above said sleeve.

14. The hull packing system of claim 13, wherein at least one of said first lubricious filler material and said second lubricious filler material includes polytetrafluoroethylene.

* * * * *